US006767411B2

United States Patent
Yeh et al.

(12) United States Patent
(10) Patent No.: US 6,767,411 B2
(45) Date of Patent: Jul. 27, 2004

(54) LEAD-FREE SOLDER ALLOY AND SOLDER REFLOW PROCESS

(75) Inventors: Shing Yeh, Kokomo, IN (US); Bradley H. Carter, Kokomo, IN (US); Curtis W. Melcher, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 160 days.

(21) Appl. No.: 10/099,861

(22) Filed: Mar. 15, 2002

(65) Prior Publication Data

US 2003/0175146 A1 Sep. 18, 2003

(51) Int. Cl.[7] .......................................... B23K 35/363
(52) U.S. Cl. ....................................................... 148/24
(58) Field of Search ............................................ 148/24

(56) References Cited

U.S. PATENT DOCUMENTS

| | | | | |
|---|---|---|---|---|
| 4,778,733 A | | 10/1988 | Lubrano et al. ............. | 428/647 |
| 4,938,924 A | | 7/1990 | Ozaki .......................... | 420/558 |
| 5,527,628 A | | 6/1996 | Anderson et al. ........... | 428/647 |
| 5,803,340 A | * | 9/1998 | Yeh et al. .................... | 228/56.3 |
| 5,938,862 A | * | 8/1999 | Yeh et al. .................... | 148/400 |
| 6,251,501 B1 | * | 6/2001 | Higdon et al. .............. | 428/209 |
| 6,259,593 B1 | | 7/2001 | Moriwaki et al. ........... | 361/303 |

FOREIGN PATENT DOCUMENTS

| | | | | |
|---|---|---|---|---|
| EP | 0858859 | | 8/1998 | ........... B23K/35/26 |
| EP | 1180411 | | 2/2002 | ........... B23K/35/26 |
| JP | 05050286 | | 3/1993 | ........... B23K/35/26 |
| JP | 08215880 | | 8/1996 | ........... B23K/35/26 |
| JP | 2000042784 | | 2/2000 | ........... B23K/35/26 |
| WO | 9709455 | | 3/1997 | ........... C22C/13/00 |

\* cited by examiner

*Primary Examiner*—Daniel Jenkins
(74) *Attorney, Agent, or Firm*—Stefan V. Chmielewski (57) ABSTRACT

A lead-free solder alloy consisting essentially of, by weight, 3.0% to 3.5% silver, greater than 1% to about 15% copper, the balance tin and incidental impurities, and having an effective melting range of about 215° C. to about 222° C. The solder alloy is noneutectic, and therefore characterized by solidus and liquidus temperatures, the former being in a range of about 215° C. to about 218° C., while the latter is about 290° C. or more. However, the melting mechanism exhibited by the alloy is such that the alloy is substantially all melted and does not exhibit a "mushy zone" above the effective melting range, enabling the alloy to behave similarly to the SnAgCu eutectic alloy.

43 Claims, 6 Drawing Sheets

LEAD-FREE SOLDER ALLOY AND SOLDER REFLOW PROCESS

CROSS REFERENCE TO RELATED APPLICATIONS

Not applicable.

STATEMENT REGARDING FEDERALLY SPONSORED RESEARCH

Not applicable.

BACKGROUND OF THE INVENTION (1) Field of the Invention

The present invention generally relates to solder compositions of the type used with electronic packaging, such as flip chip packaging. More particularly, this invention relates to lead-free solder alloys having reflow temperatures that are compatible with typical circuit board assembly processes and exhibit improved reliability over the commercially-available eutectic 63Sn-37Pb, Sn-3.5Ag and Sn-3.5Ag-1.0Cu solder alloys, particularly under high temperature and high current conditions.

(2) Description of the Related Art

Surface-mount (SM) semiconductor devices such as flip chips and ball grid arrays (BGA's) are attached to circuit boards with beadlike terminals formed on interconnect pads located on one surface of the device. The terminals are typically in the form of solder bumps near the edges of the chip, and serve to both secure the chip to the circuit board and electrically interconnect the flip chip circuitry to a conductor pattern on the circuit board. Due to the numerous functions typically performed by the microcircuitry of flip chips and BGA's, a relatively large number of solder bumps are required. The size of a typical flip chip is generally on the order of a few millimeters per side, resulting in the solder bumps being crowded along the edges of the chip.

Because of the narrow spacing required for the solder bumps and their conductors, soldering a flip chip or other SM component to a conductor pattern requires a significant degree of precision. Reflow solder techniques are widely employed for this purpose, and entail precisely depositing a controlled quantity of solder on the pads of the chip using methods such as electrodeposition and printing. Once deposited, heating the solder above its melting or liquidus temperature (for eutectic and noneutectic alloys, respectively) serves to form the solder bumps on the pads. After cooling to solidify the solder bumps, the chip is soldered to the conductor pattern by registering the solder bumps with their respective conductors and then reheating, or reflowing, the solder so as to form solder connections that metallurgically adhere to the conductors. The temperature at which the solder bumps are reflowed to form solder connections is referred to as the reflow temperature, and is conventionally about 20° C. to about 50° C. above the melting or liquidus temperature of the particular solder alloy.

Flip chip interconnect pads are electrically interconnected with the circuitry on the flip chip through vias. Because aluminum metallization is typically used in the fabrication of integrated circuits, interconnect pads are typically aluminum or aluminum alloy, which are generally unsolderable and susceptible to corrosion if left exposed. Consequently, one or more additional metal layers are often deposited on the pads to promote wetting and metallurgical bonding with solder bump alloys. These additional metal layers, referred to as under bump metallurgy (UBM), may be, for example, sputtered nickel and copper, respectively, or an evaporated multilayer structure of chromium, a diffusion barrier layer of a chromium-copper alloy, and a solderable layer of copper. In each example, copper forms the outer layer of the UBM because it is readily solderable, i.e., can be wetted by and will metallurgically bond with solder alloys of the type used for solder bumps.

Figure 1:
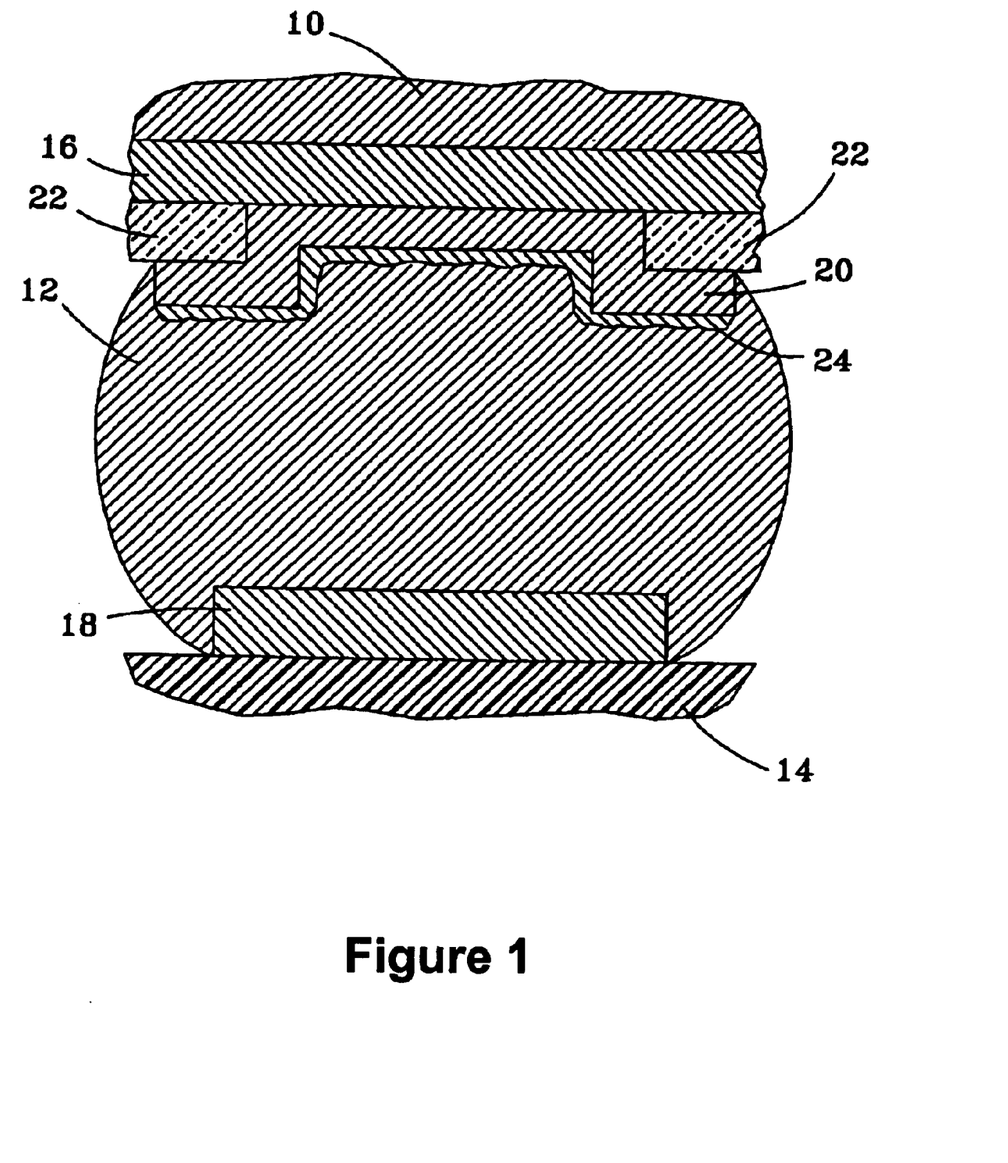
FIG. 1 represents a cross-sectional view of a solder bump connection of a flip chip formed in accordance with the present invention.

FIG. 1 represents a cross-section through a solder bump connection or joint 12 of a flip chip 10 attached to a circuit board 14, such as an organic circuit board known in the industry as FR-4, though the chip 10 could be mounted to a flexible circuit, ceramic or silicon substrate, or another suitable material. The solder joint 12 is bonded to an aluminum runner 16 on the chip 10 and a copper trace 18 on the board 14, thereby electrically and mechanically connecting the chip 10 to the board 14. As shown, a portion of the runner 16 is exposed by an opening in a passivation layer 22 to define an interconnect pad on which a UBM 20 has been deposited. The solder joint 12 has a shape characteristic of a reflowed solder bump alloy, such as the eutectic 63Sn/37Pb solder alloy (melting point of 183° C.) and the eutectic Sn-3.5Ag solder alloy (melting point of 221.0° C.) widely used for flip chip assemblies. As would be expected, controlling the width of the solder joint 12 is necessary to prevent shorting with adjacent connections. Controlling the height of the solder joint 12 is also necessary to prevent the molten solder from drawing the flip chip 10 excessively close to the circuit board 14 during the reflow operation, when the molten solder bump tends to spread outward as a result of wetting the surfaces it contacts. The ability to control solder bump height and width is determined in part by the reflow characteristics of the solder alloy used, based on its melting point (for a eutectic alloy) or solidus and liquidus temperatures (for non-eutectic alloys), and the peak reflow temperatures required by the particular circuit board assembly.

There is a desire in the electronics industry to limit the use of lead-containing materials due to environmental concerns for the toxicity of lead, as well as reliability concerns due to the alpha particles emitted by lead-containing bump alloys. There are many commercially available Pb-free alloys, most notably Sn-5Ag, eutectic Sn-3.5Ag (melting point of 221° C.), and eutectic Sn-0.9Cu (melting point of 227° C.), and their derivatives, including Sn-4.0Ag-0.5Cu, Sn-3.9Ag-0.6Cu, Sn-3.8Ag-0.7Cu, Sn-4Ag-1Cu, Sn-4.7Ag-1.7Cu, Sn-2.5Ag-0.8Cu-0.5Sb, Sn-5Sb, Sn-8.5Sb, Sn-3.4Ag-1Cu-3.3Bi, Sn-3Ag-2Bi, Sn-3.4Ag-4.8Bi, Sn-9Zn, Sn-8.8In-7.6Zn, Sn-58Bi, Sn-3.5Ag-1.5In, Sn-3.2Ag-1Cu-10In, and Sn-2.8Ag-20In. To be compatible with widely-used FR-4 circuit board assembly processes, the maximum reflow temperature of a solder alloy must not be higher than about 270° C., and preferably not higher than 260° C., in order to avoid damage to the circuit board and its components through board warping, pop-corning, delamination, etc. On the other hand, reflow temperatures below about 240° C. may result in poorly formed solder joints as a result of poor wetting, cold solder joint, etc. An additional requirement for automotive applications is the ability to withstand 150° C. junction temperatures for an extended period of time (e.g., 2000 hours continuous operation at 150° C.). This requirement excludes all Pb-free alloys with solidus temperatures under about 180° C., such as Sn-52n, Bi-42Sn and Sn-2.8Ag-20In. In view of these and other demands for solder bump connections, eutectic Sn—Ag—Cu and near-eutectic Sn—Ag—Cu alloys have become widely used as a lead-free solder for reflow assembly processes.

The eutectic composition for Sn—Ag—Cu is not yet clear. Sn-4.7Ag-1.7Cu, Sn-4.0Ag-0.5Cu, Sn-3.9Ag-0.6Cu, Sn-3.8Ag-0.7Cu and Sn-3.5Ag-1.0Cu have each been treated by various researchers as the eutectic composition for SnAgCu. The Sn-4.7Ag-1.7Cu alloy, the only alloy in this group having a copper content above 1 weight percent, is disclosed in U.S. Pat. No. 5,527,628 to Anderson et al. Although described as being a eutectic composition for SnAgCu with a eutectic melting temperature of 217.0° C. and a melting range ("mushy" zone) of not more than 15° C., the differential scanning calorimetry (DSC) chart of FIG. 1 from this patent shows this composition to actually have a very wide melting range, from 217.0° C. to about 240° C., and therefore a plastic range of about 23° C. Anderson et al. also teach that, while the relative amounts of tin, silver and copper can be varied (within a disclosed range of 3.5 to 7.7 weight percent silver, 1.0 to 4.0 weight percent copper, balance tin) to provide a melting range above the eutectic melting temperature (217.0° C.), such variations are said to result in higher melting temperatures. In any event, the wide plastic range of this alloy requires a reflow temperature much higher than those required for the other SnAgCu alloys that have been considered as eutectics, and can result in cold or disturbed solder joints during the circuit board assembly process, reducing the reliability of the circuit board assembly.

In addition to having acceptable reflow characteristics, another consideration when selecting solder alloys for flip chip applications is the electromigration of the UBM material in the direction of electron flux. There is a tendency for electromigration to occur in solder joints formed of SnAg and SnAgCu alloys, resulting in a resistive or open solder connection. When a thin-film UBM is used, such as a sputtered Al—NiV—Cu metallization or evaporated Cr—CrCu—Cu—Au metallization, this mass transport mechanism can become the predominant failure mechanism under severe service conditions.

In view of the above, there is a need to improve the above reliability of lead-free Sn—Ag—Cu solders while maintaining a peak reflow temperature near that of the eutectic SnAg and eutectic SnAgCu alloys, which is about 240° C. to 260° C., based on the conventional wisdom that the peak reflow temperature for a solder alloy should be about 20° C. to 50° C. above its melting or liquidus temperatures.

BRIEF SUMMARY OF THE INVENTION

The present invention is directed to a solder alloy, and more particularly a lead-free solder alloy containing tin, silver and copper as its alloying constituents. The solder alloy consists essentially of, by weight, 3.0% to 3.5% silver, greater than 1% to about 15% copper, the balance tin and incidental impurities, and has an effective melting range of about 215° C. to about 222° C. (As used herein, the term "consisting essentially of" to mean the absence of additions that would alter the melting range of the solder alloy.) Solder alloys of this invention are noneutectic, and are therefore characterized by solidus and liquidus temperatures. The alloys have a solidus temperature in a range of about 215° C. to about 218° C., and may have a liquidus temperature of about 290° C. or more. However, a surprising aspect of the invention is the melting mechanism exhibited by the alloy, in that the alloy is substantially all melted and does not exhibit a "mushy zone" within a narrow temperature range (215° C. to 222° C.), hence the term "effective melting temperature" in which the alloy of this invention behaves similarly to the proposed SnAgCu eutectic alloys (e.g., Sn-3.5Ag-1.0Cu, melting point of 217° C.), even though the actual liquidus temperature is well above the effective melting range for the alloy.

According to the invention, the melting mechanism of the alloy is attributable to the presence and dissolution or melting of at least one of two intermetallic compounds (IMC's), $Cu_6Sn_5$ or $Cu_3Sn$, which were determined to exist above the SnAgCu eutectic melting point. However, because of the compositions and very limited amounts of these IMC's, their dissolution/melting in the alloy is not readily apparent unless the melting behavior of the alloy is very carefully examined. In any event, alloys of this invention containing up to 10 weight percent copper have been shown to reflow at temperatures much lower than their actual liquidus temperatures, to the extent that these compositions can be treated as eutectic compositions with very small amounts of $Cu_6Sn_5$ or $Cu_3Sn$ IMC particles suspended in the liquid solder during reflow at peak temperatures of about 253° C. Depending on the particular copper content of the solder alloy, suitable peak reflow temperatures are in the range of about 230° C. to 280° C.

In addition to their favorable reflow characteristics, the alloys of this invention have been shown to advantageously increase the effective thickness of a UBM used in flip chip and BGA applications, thereby increasing the time required for the electromigration to progress to the point where a resistive or open solder connection exists. More particularly, the alloys contain a sufficient amount of copper above the eutectic level, such that copper precipitates out as $Cu_6Sn_5$ and possibly $Cu_3Sn$ intermetallic compounds (IMC's) along the UBM/solder interface, as well as in the bulk of the solder joint. In this manner, the thickness of the UBM is effectively increased with a copper-rich layer, and the combination of the original UBM metallization and the precipitated IMC's extend the life of the solder connection under even severe current and temperature conditions. The additional CuSn IMC in the bulk of the solder connection also increases resistance to electromigration through the connection.

Other objects and advantages of this invention will be better appreciated from the following detailed description.

DETAILED DESCRIPTION OF THE INVENTION

The invention is an improvement over the eutectic Sn-3.5Ag and Sn-3.5Ag-1.0Cu alloys, by which additional copper is added that precipitates out as CuSn IMC's. In an application such as the flip chip solder joint connection represented in FIG. 1, these CuSn IMC's precipitate along the interface between the solder joint 12 and the UBM 20, as represented by the thin IMC layer 24 in FIG. 1, as well as in bulk of the solder joint 12. The result is effectively a thicker composite UBM comprising the original UBM 20 and the IMC layer 24. The thicker composite UBM is capable of surviving longer than the UBM 20 alone when the solder joint 12 is subject to electromigration, thus increasing the reliability of the joint 12 under severe current and temperature conditions. Additional CuSn IMC distributed in the bulk of the solder joint 12 also results in the solder alloy being saturated with copper, thereby providing additional resistance to electromigration that further improves the reliability of the joint 12.

The above benefits made possible with this invention are achieved with a SnAgCu noneutectic alloy having a composition of, by weight, 3.0% to 3.5% silver, greater than 1% copper and preferably about 2% to about 15% copper, with the balance essentially tin (about 81.5% to about 96%) and incidental impurities. As was noted in U.S. Pat. No. 5,527,628 to Anderson et al., the liquidus temperature of a near-eutectic SnAgCu alloy would be expected to increase above the eutectic melting temperature (about 217° C.) with increasing copper content. The recommended peak reflow temperature for a solder alloy is usually 20° C. to 50° C. above its liquidus temperature, such that the typical peak reflow temperatures for eutectic SnAg (melting point of about 221.0° C.) and the proposed eutectic Sn-3.5Ag-1.0Cu alloy (melting point of about 217° C.) are in a range of about 240° C. to about 260° C. While this peak reflow temperature range avoids thermal damage to organic circuit boards and yields good quality solder joints, increases in copper content above the 1.0% eutectic level would be expected to raise the liquidus temperature and, if sufficiently high, would result in a peak reflow temperature that is too high for organic circuit board applications.

With reference to the Sn-4.7Ag-1.7Cu alloy described as a eutectic by Anderson et al., any modifications to the nominal composition are said to increase the melting temperature above the 217° C. point reported by Anderson et al., presumably with a larger "mushy" zone than even the 23° C. range seen with the Sn-4.7Ag-1.7Cu alloy. However, solder alloys with copper contents in the range stated above for this invention have been surprisingly shown to exhibit a different melting mechanism, apparently as a result of keeping the silver content of the alloy between 3.0 and 3.5 weight percent, such as from about 3.1 to about 3.4 weight percent. Specifically, alloys of this invention containing as much as 10 weight percent copper have been demonstrated to essentially completely melt within a very narrow temperature of about 215° C. to about 222° C., with the exception of the above-noted CuSn IMC's. With very careful examination of the DSC data for these alloys, the actual liquidus temperatures have been identified as occurring at about 290° C. or higher, depending on copper content. Nonetheless, the amount and distribution of the CuSn IMC's allow the alloys of this invention to reflow within the "effective" melting range of 215° C. to 222° C., which permits the use of peak reflow temperatures well within the acceptable range of 240° C. to about 260° C. for circuit board applications.

In view of the above, the present invention can be seen as a family of solder alloys whose melting properties differ from the Sn-4.7Ag-1.7Cu alloy disclosed by Anderson et al. While their Sn-4.7Ag-1.7Cu alloy is disclosed as having a melting point of about 217° C., and is said to encompass silver and copper contents of 3.5 to 7.7 and 1.0 to 4.0 weight percent, respectively, Anderson et al. disclose that their alloy has a "mushy" zone of up to 15° C., though melting actually occurs up to about 240° C., establishing a melting range of about 23° C. As such, while Anderson et al. report a eutectic with a melting point of 217° C. and a mushy zone of not more than 15° C., one skilled in the art might consider such an alloy to actually be a near-eutectic with a melting range (instead of melting point) of 217° C. to about 240° C. In contrast, alloys of the present invention have a melting range of only about 7° C. (about 215° C. to about 222° C.), within which the alloys are able to completely reflow. While not wishing to be held to any particular theory, it appears that the alloys evaluated by Anderson et al. were limited to the disclosed Sn-4.7Ag-1.7Cu, Sn-3.6Ag-1.5Cu, and Sn-4.1Ag-0.9Cu alloys, such that the properties exhibited by the alloys of this invention could not have been predicted from Anderson et al. as a result of the excessive silver levels used. The 3.5% to 7.7% range for silver proposed by Anderson et al., the reported silver levels of 3.6%, 4.1% and 4.7% reported by Anderson et al., and the absence of any indication of the melting mechanism similar to that observed with the alloys of this invention, evidence the criticality of maintaining the silver content in a range of 3.0 to 3.5%, preferably between 3 and 3.5%, and more preferably about 3.1% to about 3.4%.

In a first investigation leading to this invention, HTOL (high temperature operational life) tests were performed to evaluate the impact on flip chip bump reliability with additions of copper to a SnAgCu alloy. In the investigation, the eutectic 63Sn-37Pb alloy (as reference), the eutectic Sn-3.5Ag alloy, the proposed eutectic Sn-3.5Ag-1.0Cu alloy, and two near-eutectic SnAgCu alloys (Sn-2.5Ag-0.8Cu-0.5Sb and Sn-3.2Ag-1Cu-10In) were evaluated along with SnAgCu alloys containing sufficient copper to attain copper levels of about 2 and 4 weight percent. The test employed a 150×150 mils (about 3.81×3.81 mm) bi-polar power flip chip with 18 mil (about 0.46 mm) pitch solder connections, attached and underfilled on a laminate circuit board, and tested at current levels of about 700 mA per bump, an ambient temperature of about 150° C., and a junction temperature of about 163° C. The Weibull life for the test specimens is reported in Table I below, as well as the relative reliability of the specimens using the Sn-3.5Ag alloy as baseline.

TABLE I

| Alloy | Weibull Life (hours) | Relative Reliability |
|---|---|---|
| Sn-3.5Ag | 166 | 1.0 |
| Sn-2.5Ag-0.8Cu-0.5Sb | 550 | 3.3 |
| Sn-3.2Ag-1.0Cu-10In | 200 | 1.2 |
| Sn-3.5Ag-1.0Cu | 770 | 4.6 |
| Sn-3.4Ag-2.0Cu | 1019 | 6.1 |
| Sn-3.3Ag-4.0Cu | 1472 | 8.9 |
| 63Sn-37Pb | 208 | 1.3 |

As can be seen in the above table, the reliability of the Sn-3.5Ag (eutectic) is slightly less than the 63Sn-37Pb eutectic, with improved reliability being observed with increasing levels of copper. Adding sufficient copper to yield a copper content of about 4 weight percent increased reliability by a factor of about 8.9 relatively to the eutectic Sn-3.5Ag alloy, and improved reliability by about 167% over the well-known eutectic Sn-2.5Ag-0.8Cu-0.5Sb alloy. From these data, it was concluded that the reliability of the eutectic SnAgCu alloy could be further improved with even higher copper contents.

As a second investigation, a reflow experiment was conducted with ingots of SnAgCu alloys prepared by adding copper to the molten eutectic Sn-3.5Ag alloy to attain copper levels of up to about 20 weight percent. The molten alloys were heated above about 500° C. for about 30 minutes to ensure complete alloying of all three elements, yielding the following compositions whose solidus and liquidus temperatures were determined by DSC analysis.

TABLE II

| Alloy | Solidus (° C.) | Liquidus (° C.) |
|---|---|---|
| Sn-3.5Ag (baseline) | 22.10 | 221.0 |
| Sn-3.5Ag-1.0Cu | 216.9 | 216.9 |
| Sn-3.4Ag-2.0Cu | 216.3 | 289.2 |
| Sn-3.3Ag-4.0Cu | 216.9 | 359.1 |
| Sn-3.3Ag-6.0Cu | 215.2 | 397.2 |
| Sn-3.2Ag-8.0Cu | 217.5 | 413.9 |
| Sn-3.2Ag-10.0Cu | 217.8 | 459.8 |
| Sn-3.1Ag-12.0Cu | 216.7 | 480.1 |
| Sn-3.0Ag-15.0Cu | 217.3 | 480.7 |
| Sn-2.8Ag-20.0Cu | 218.0 | 538.7 |

For the reflow experiment, small pieces were cut from each ingot, placed on a ceramic substrate, fluxed with a Type RMA flux, and then run through a reflow oven with a peak reflow temperature of about 253° C. The reflow profile used was typical for circuit assembly processes using the eutectic Sn-3.5Ag solder alloy. The baseline eutectic Sn-3.5Ag alloy and those alloys modified to contain up to 10 weight percent copper were observed to reflow completely, forming characteristic spherical solder balls. Partial reflow was observed for the samples containing 12 and 15 weight percent copper. Based on the DSC data, it was concluded that the 12% and 15% Cu samples would reflow completely if the peak reflow temperature was increased to about 280° C.

The above results contradict the conventional wisdom that the peak reflow temperature must be 20° C. to 50° C. above the liquidus temperature of the solder alloy. For example, the Sn-3.2Ag-10.0Cu alloy was determined by DSC analysis to have a liquidus temperature of 459.8° C., yet the samples of this alloy were found to reflow completely at 253° C. In addition to the DSC analysis, a metallurgical analyses was conducted to better understand this phenomenon.

Figure 2:
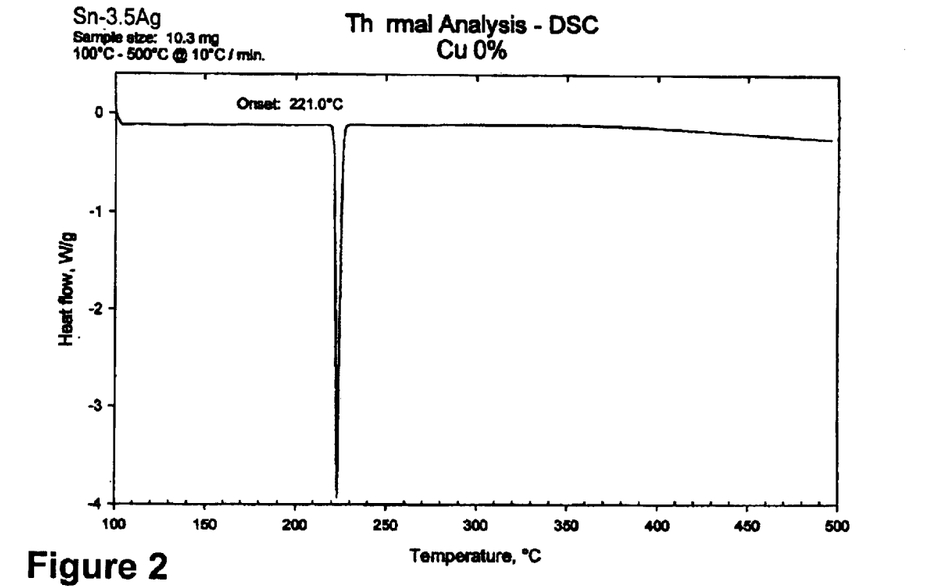
FIGS. 2 through 9 are plots taken from thermal analysis of various solder alloy compositions using differential scanning calorimetry.
Figure 3:
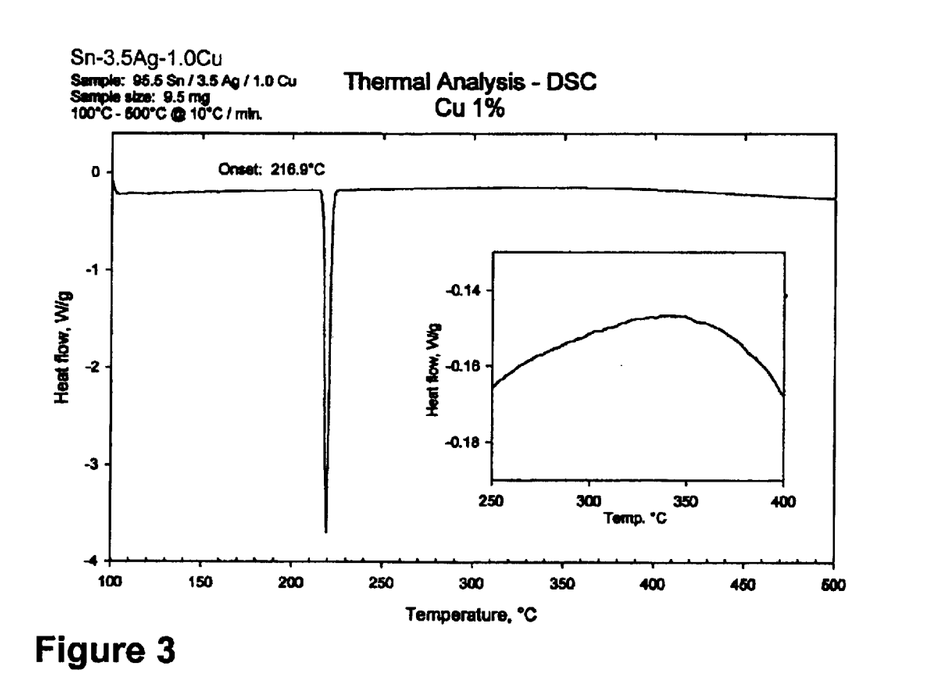
Figure 4:
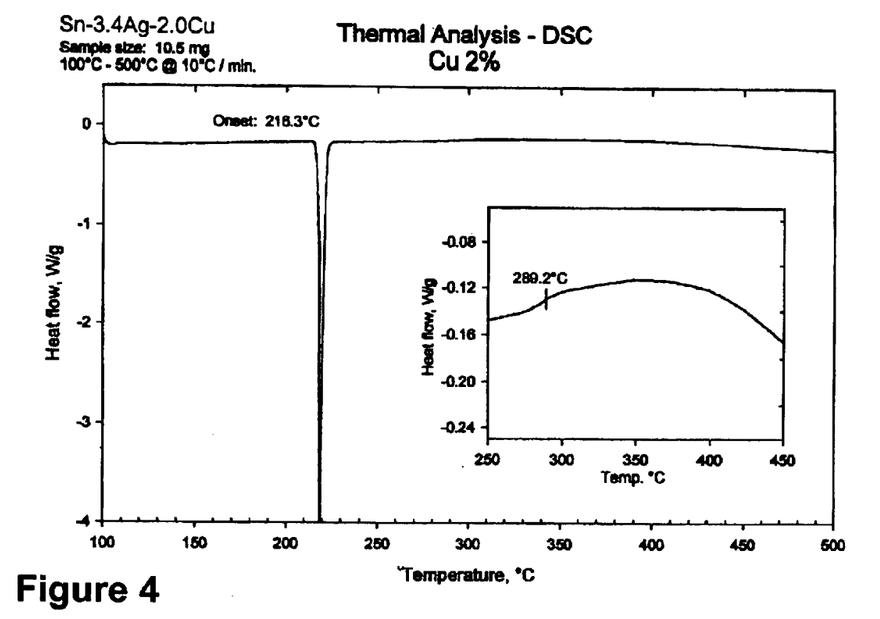
Figure 5:
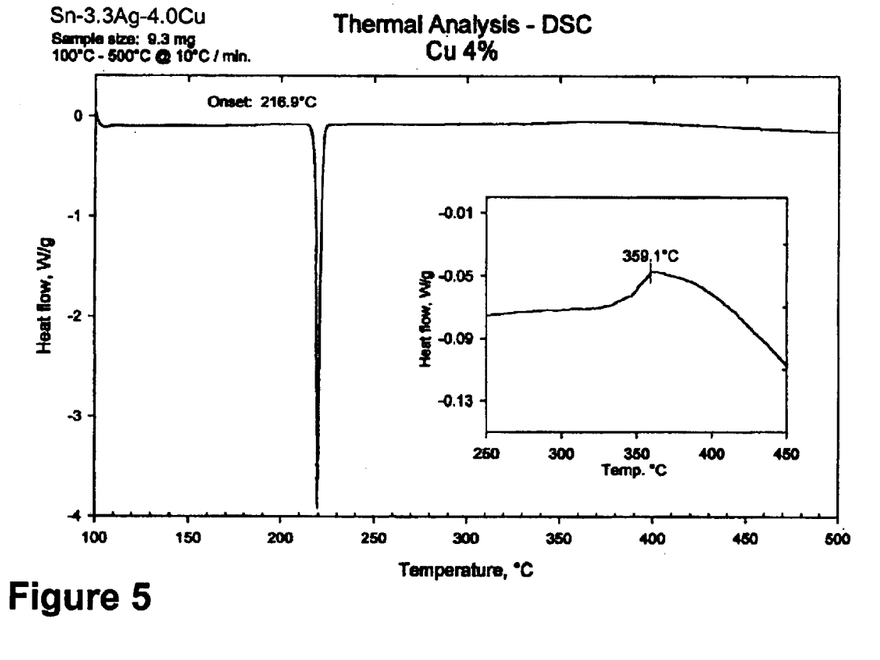
Figure 6:
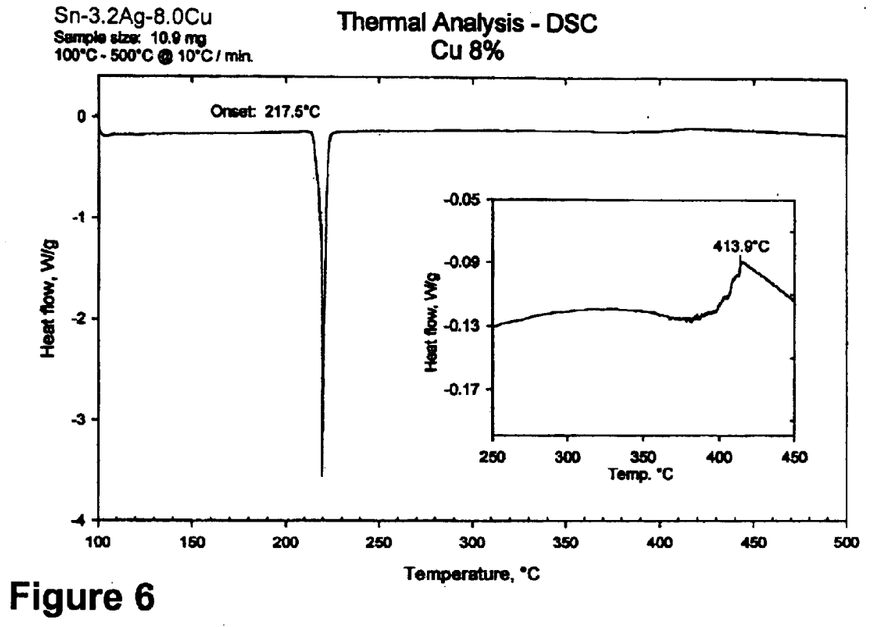
Figure 7:
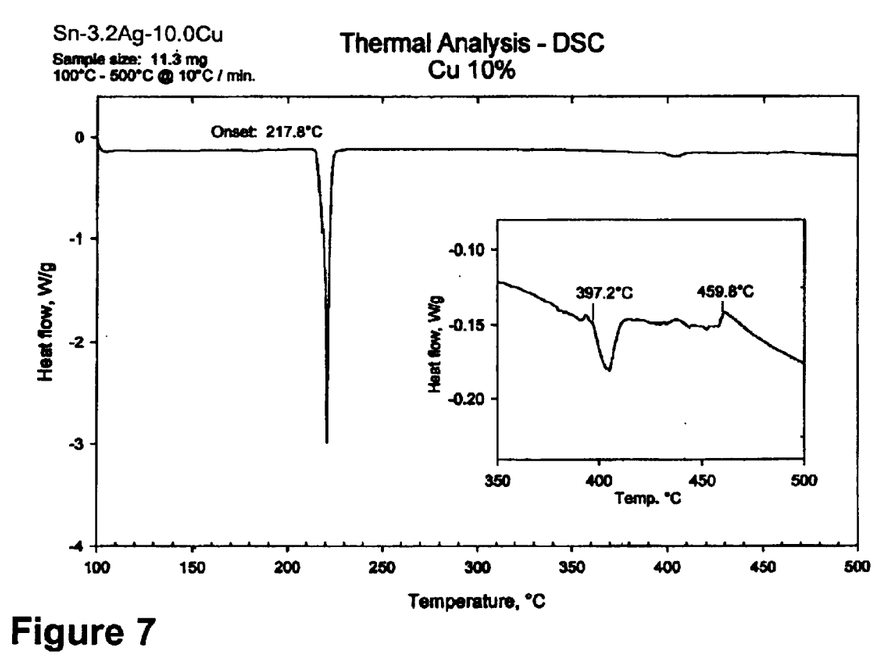
Figure 8:
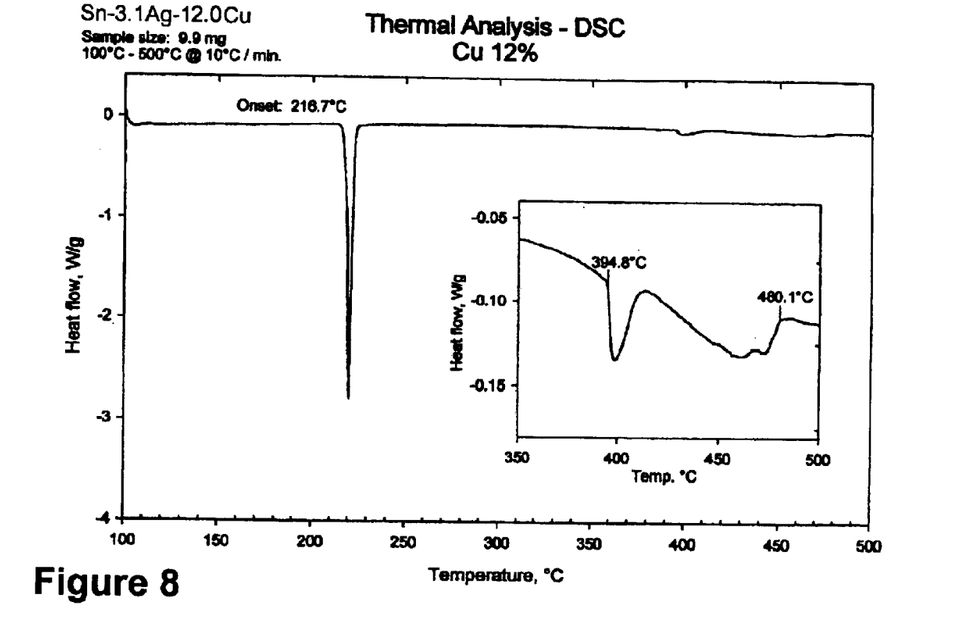
Figure 9:
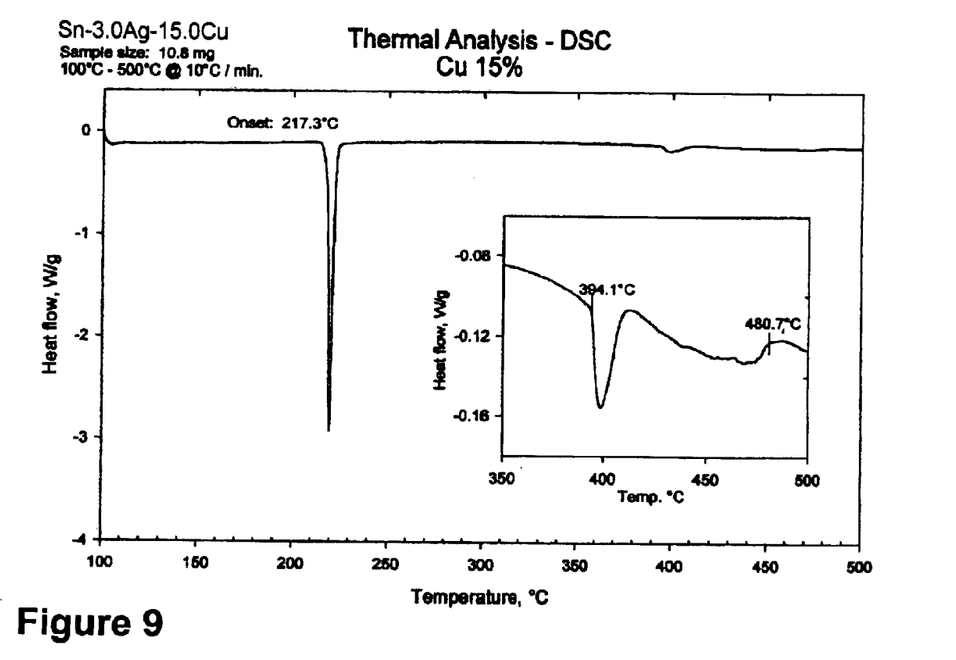
Figure 10:
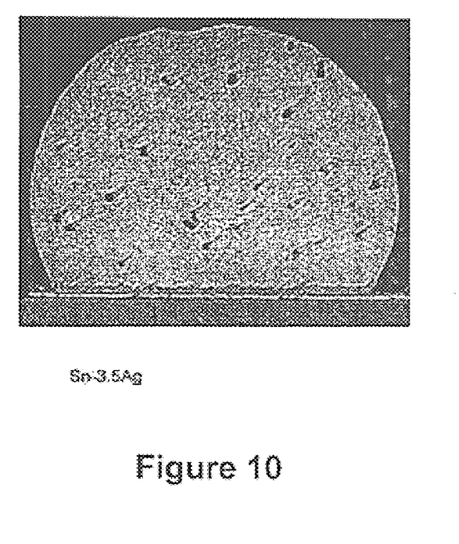
FIGS. 10 and 11 are microphotographs of cross-sections of solder bumps formed by eutectic SnAg and SnAgCu solder alloys of the prior art.
Figure 11:
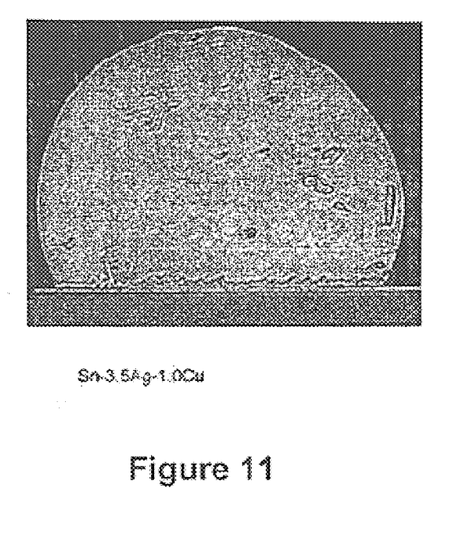

As would be expected, the DSC data for the eutectic Sn-3.5Ag and Sn-3.5Ag-1.0Cu alloys (FIGS. 2 and 3) evidenced distinct melting points of 221.0° C. and 216.9° C., respectively. However, from the DSC data represented as FIGS. 4 through 9, the non-eutectic alloys containing copper were also found to have a very narrow melting range around 217° C., which is the eutectic temperature of Sn-3.5Ag-1.0Cu. However, with additions of 2 weight percent copper and higher, a small kink can be seen in the DSC curves between about 290° C. and about 480° C. This kink apparently results from the dissolution or melting of the CuSn IMC's in the bulk of the solder alloy. For copper additions of 2% to 8%, the predominate pro-eutectic phase was $Cu_6Sn_5$ IMC. For copper levels above 8%, $Cu_3Sn$ IMC was observed to appear, such that the pro-eutectic phase was a mixture of $Cu_6Sn_5$ and $Cu_3Sn$ IMC. The melting temperature of the $Cu_6Sn_5$ IMC was determined to be around 400° C. However, as is apparent from the DSC charts of FIGS. 4 through 9, the dissolution or melting of $Cu_6Sn_5$ and $Cu_3Sn$ IMC above the SnAgCu eutectic melting range was not readily apparent. These reactions could only be seen when the area of interest was magnified as shown in the inset provided with each of FIGS. 4 through 9. It was determined that the amount of CuSn IMC's in the alloys was very limited, such that quantitative analysis could not be done accurately. It was concluded that this could explain at least in part why alloys containing about 2% to about 10% copper were able to be completely reflowed at temperatures much lower than their liquidus temperatures. In terms of reflow characteristics, it was concluded that SnAgCu alloys containing between 3.0 and 3.5 weight percent silver and about 2% to about 10% copper could be treated as eutectic compositions with very small amounts of $Cu_6Sn_5$ and possibly $Cu_3Sn$ IMC particles suspended in the liquid solder during reflow using peak reflow temperatures of about 230° C. to about 280° C.

Figure 12:
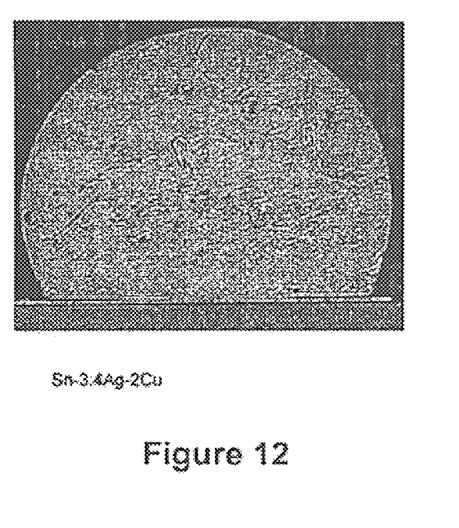
FIGS. 12 and 13 are microphotographs of cross-sections of solder bumps formed by noneutectic SnAgCu solder alloys of the present invention.
Figure 13:
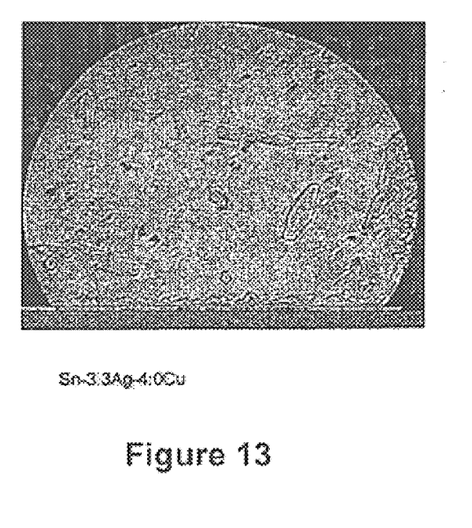

Metallurgical analyses were then conducted on the ingots, as well as on solder bumps formed of the alloys of Table II. The solder bumps were formed by depositing and then reflowing the alloys on chips having aluminum runners and thin-film (about one micrometer) NiV—Cu UBM. The microstructures of all of the alloys were confirmed to have a eutectic SnAgCu matrix containing a Sn-rich phase with small $Cu_6Sn_5$ and $Ag_3Sn$ IMC particles of about one micrometer in size. The matrix and IMC particles can be seen in FIGS. 10 through 13, which are microphotographs of cross-sections through solder bumps formed of the Sn-3.5Ag and Sn-3.5Ag-1.0Cu eutectic alloys and this invention's noneutectic Sn-3.4Ag-2.0Cu and Sn-3.3Ag-4.0Cu alloys, respectively. However, as the copper content exceeded the eutectic level (1.0 weight percent), pro-eutectic CuSn IMC's began to appear, as seen in FIGS. 12 and 13. For alloys with copper contents below 8%, $Cu_6Sn_5$ IMC was the primary pro-eutectic phase. When the copper content exceeded 8%, $Cu_3Sn$ IMC particles began to appear, resulting in a pro-eutectic structure comprising a mixture of $Cu_6Sn_5$ and $Cu_3Sn$ IMC's. The amount of the $Cu_3Sn$ particles was observed to increase with higher copper contents.

As can be seen in FIGS. 12 and 13, the amount of pro-eutectic CuSn IMC's in the solder bumps increased with increasing copper content. The presence of greater amounts of pro-eutectic CuSn IMC particles in FIGS. 12 and 13 evidenced that these alloys were saturated with copper, making migration of copper through the bumps via electromigration much more difficult. FIGS. 12 through 13 also evidence that the pro-eutectic IMC's have deposited along the solder/UBM interface, effectively increasing the UBM thickness. The combined thicknesses of the original UBM's and the deposited IMC layers of the four alloys are summarized below.

TABLE III

| Alloy | UBM Thickness (micrometers) |
|---|---|
| Sn-3.5Ag | 1–2 |
| Sn-3.5Ag-1.0Cu | 2–5 |
| Sn-3.4Ag-2.0Cu | 3–7 |
| Sn-3.3Ag-4.0Cu | 5–8 |

As can be seen in Table III, the effective UBM thickness after bumping increased with increasing copper content. During high current and temperature (e.g., HTOL) testing, UBM materials migrate in the direction of electron flow away from the chip, until eventually the solder joint becomes excessively resistive. With their thicknesses effectively increased with the alloys of this invention, a longer period of time at elevated current and temperature would be necessary to deplete a UBM, thus making the solder joint connection more reliable. Based on diffusion theory, reliability would be expected to increase as a square of the UBM thickness increase, such that solder joints formed of the Sn-3.3Ag-4.0Cu alloy would be up to sixty-four times as reliable as solder joints formed of the eutectic Sn-3.5Ag alloy, and up to sixteen times as reliable as solder joints formed of the eutectic Sn-3.5Ag-1.0Cu alloy.

While the invention has been described in terms of a preferred embodiment, it is apparent that other forms could be adopted by one skilled in the art. Accordingly, the scope of the invention is to be limited only by the following claims.

What is claimed is:

1. A solder alloy consisting essentially of, by weight, at least 3.1% to 3.5% silver, greater than 3% to about 15% copper, the balance tin and incidental impurities, the alloy having an effective melting range of about 215° C. to about 222° C. above which the alloy does not exhibit a mushy zone.

2. A solder alloy according to claim 1, wherein the solder alloy has a solidus temperature in a range of about 215° C. to about 218° C.

3. A solder alloy according to claim 1, wherein the solder alloy has a liquidus temperature of about 290° C. or more.

4. A solder alloy according to claim 1, wherein the copper content is at least 4 to about 10 weight percent of the alloy.

5. A solder alloy according to claim 1, wherein the copper content is greater than 4 weight percent of the alloy.

6. A solder alloy according to claim 1, wherein the copper content is greater than 6 weight percent of the alloy.

7. A solder alloy according to claim 1, wherein the silver content is at least 3.2 weight percent of the alloy.

8. A solder alloy according to claim 1, wherein the silver content is at least 3.3 weight percent of the alloy.

9. A solder alloy according to claim 1, wherein the solder alloy consists of, by weight, about 3.0% silver, about 15% copper, the balance tin and incidental impurities.

10. A solder alloy according to claim 1, wherein the solder alloy consists of, by weight, about 3.1% silver, about 12% copper, the balance tin and incidental impurities.

11. A solder alloy according to claim 1, wherein the solder alloy consists of, by weight, about 3.2% silver, about 8% to about 10% copper, the balance tin and incidental impurities.

12. A solder alloy according to claim 1, wherein the solder alloy consists of, by weight, about 3.3% silver, about 4% to about 6% copper, the balance tin and incidental impurities.

13. A solder alloy according to claim 1, wherein the solder alloy contains, by weight, about 3.4% silver.

14. A solder alloy according to claim 1, wherein the solder alloy is in the form of a solder bump on a surface-mount integrated circuit device.

15. A solder alloy according to claim 1, wherein the solder alloy is in the form of a solder joint attaching a component to a laminate or ceramic substrate.

16. A solder bump formed of an alloy consisting essentially of, by weight, 3.0% to 3.5% silver, greater than 3% to about 15% copper, the balance tin and incidental impurities, the alloy having a solidus temperature in a range of about 215° C. to about 218° C., a liquidus temperature of at least 290° C., and an effective melting range of about 215° C. to about 222° C. above which the alloy does not exhibit a mushy zone.

17. A solder bump according to claim 16, wherein the copper content is greater than 4 weight percent of the alloy.

18. A solder bump according to claim 16, wherein the copper content is greater than 6 weight percent of the alloy.

19. A solder bump according to claim 16, wherein the silver content is 3.1 to 3.4 weight percent of the alloy.

20. A solder bump according to claim 19, wherein the copper content is greater than 3% to about 10 weight percent of the alloy.

21. A solder bump according to claim 16, wherein the alloy consists of, by weight, about 3.0% silver, about 15% copper, the balance tin and incidental impurities.

22. A solder bump according to claim 16, wherein the alloy consists of, by weight, about 3.1% silver, about 12% copper, the balance tin and incidental impurities.

23. A solder bump according to claim 16, wherein the alloy consists of, by weight, about 3.2% silver, about 8% to about 10% copper, the balance tin and incidental impurities.

24. A solder bump according to claim 16, wherein the alloy consists of, by weight, about 3.3% silver, about 4% to 6% copper, the balance tin and incidental impurities.

25. A solder bump according to claim 16, wherein the alloy contains, by weight, about 3.4% silver.

26. A solder bump according to claim 16, wherein the silver content of the alloy is 3.3 to 3.4 weight percent of the alloy.

27. A solder bump according to claim 16, wherein the solder bump is on a surface-mount integrated circuit device.

28. A solder bump according to claim 16, wherein the solder bump is in the form of a solder joint attaching a component to a laminate or ceramic substrate.

29. A solder reflow process performed with an alloy consisting essentially of, by weight, 3.0% to 3.5% silver, greater than 3% to about 15% copper, the balance tin and incidental impurities, the process comprising the step of heating the alloy to a peak temperature of between about 240° C. to about 260° C., at which the alloy reflows without exhibiting a mushy zone.

30. A solder reflow process according to claim 29, wherein the solder alloy has a solidus temperature in a range of about 215° C. to about 218° C.

31. A solder reflow process according to claim 29, wherein the solder alloy has a liquidus temperature of about 290° C. or more.

32. A solder reflow process according to claim 29, wherein the copper content is greater than 3% to about 10 weight percent of the alloy.

33. A solder reflow process according to claim 29, wherein the copper content is greater than 4 weight percent of the alloy.

34. A solder reflow process according to claim 29, wherein the copper content is greater than 6 weight percent of the alloy.

35. A solder reflow process according to claim 29, wherein the silver content is greater than 3.0 and less than 3.5 weight percent of the alloy.

36. A solder reflow process according to claim 29, wherein the silver content is 3.1 to 3.4 weight percent of the alloy.

37. A solder reflow process according to claim 29, wherein the solder alloy consists of, by weight, about 3.0% silver, about 15% copper, the balance tin and incidental impurities.

38. A solder reflow process according to claim 29, wherein the solder alloy consists of, by weight, about 3.1% silver, about 12% copper, the balance tin and incidental impurities.

39. A solder reflow process according to claim 29, wherein the solder alloy consists of, by weight, about 3.2% silver, about 8% to about 10% copper, the balance tin and incidental impurities.

40. A solder reflow process according to claim 29, wherein the solder alloy consists of, by weight, about 3.3% silver, about 4% to about 6% copper, the balance tin and incidental impurities.

41. A solder reflow process according to claim 29, wherein the solder alloy contains, by weight, about 3.4% silver.

42. A solder reflow process according to claim 29, wherein the process causes the solder alloy to form a solder bump on a surface-mount integrated circuit device.

43. A solder reflow process according to claim 29, wherein the process causes the solder alloy to form a solder joint attaching a component to a laminate or ceramic substrate.

* * * * *